(12) United States Patent
Derscheid et al.

(10) Patent No.: US 12,477,995 B2
(45) Date of Patent: Nov. 25, 2025

(54) ROUND BALER WRAP USAGE INDICATOR

(71) Applicant: DEERE & COMPANY, Moline, IL (US)

(72) Inventors: Daniel E. Derscheid, Ottumwa, IA (US); Bart A. Coffman, Eddyville, IA (US); Eric M. Thies, Adel, IA (US)

(73) Assignee: DEERE & COMPANY, Moline, IL (US)

(*) Notice: Subject to any disclaimer, the term of this patent is extended or adjusted under 35 U.S.C. 154(b) by 814 days.

(21) Appl. No.: 17/663,958

(22) Filed: May 18, 2022

(65) Prior Publication Data
US 2023/0371436 A1 Nov. 23, 2023

(51) Int. Cl.
| | | |
|---|---|---|
| A01F 15/07 | (2006.01) | |
| B65B 27/12 | (2006.01) | |
| B65B 57/02 | (2006.01) | |
| B65B 57/18 | (2006.01) | |

(52) U.S. Cl.
CPC ........ A01F 15/0715 (2013.01); B65B 27/125 (2013.01); *A01F 2015/076* (2013.01); *B65B 57/02* (2013.01); *B65B 57/18* (2013.01)

(58) Field of Classification Search
CPC ....... B65B 27/125; B65B 57/02; B65B 57/18; A01F 15/0715; A01F 15/07; A01F 15/071; A01F 2015/076
See application file for complete search history.

(56) References Cited

U.S. PATENT DOCUMENTS

| | | | | | |
|---|---|---|---|---|---|
| 4,151,403 | A | * | 4/1979 | Woolston | G01B 11/043 |
| | | | | | 242/563.2 |
| 4,463,913 | A | * | 8/1984 | Sato | B65H 23/182 |
| | | | | | 242/563.2 |
| 5,607,121 | A | * | 3/1997 | Boriani | B65H 26/08 |
| | | | | | 242/563.2 |
| 6,774,805 | B1 | * | 8/2004 | Viesselmann | A01F 15/0715 |
| | | | | | 340/684 |
| 7,295,895 | B2 | | 11/2007 | Smith et al. | |

(Continued)

FOREIGN PATENT DOCUMENTS

| | | | | |
|---|---|---|---|---|
| EP | 1749437 B1 * | 11/2008 | ......... | A01F 15/0715 |
| EP | 3666670 A1 * | 6/2020 | ............. | A01F 15/07 |

(Continued)

OTHER PUBLICATIONS

Extended European Search Report and Written Opinion issued in European Patent Application No. 23172544.1, dated Oct. 18, 2023, in 06 pages.

*Primary Examiner* — Arpad Fabian-Kovacs

(57) ABSTRACT

A method of monitoring a status of a supply of wrap material of a baler implement includes receiving a supply roll length input when a new supply roll of wrap material is loaded into a wrap system of the baler implement. A respective length of the wrap material used to wrap each bale since receiving the supply roll length input is determined and summed together to define a total current used wrap value. The total current used wrap value is subtracted from the total longitudinal length to define a current remaining length of the wrap material. A notification signal is communicated to a communicator to indicate to an operator the current remaining length of the wrap material on the supply roll of the wrap material.

14 Claims, 4 Drawing Sheets

(56) References Cited

U.S. PATENT DOCUMENTS

| | | | | |
|---|---|---|---|---|
| 7,694,491 | B2 * | 4/2010 | Noonan | A01F 15/071 53/461 |
| 8,490,366 | B1 * | 7/2013 | Hintz | A01F 15/0715 53/118 |
| 10,926,908 | B2 | 2/2021 | Schlichting | |
| 11,134,614 | B2 * | 10/2021 | Eubanks | A01F 15/0715 |
| 2009/0107348 | A1 * | 4/2009 | Noonan | A01D 87/127 100/8 |
| 2009/0107349 | A1 | 4/2009 | Noonan et al. | |
| 2020/0178469 | A1 * | 6/2020 | Schlichting | A01F 15/0715 |

FOREIGN PATENT DOCUMENTS

| | | | | |
|---|---|---|---|---|
| EP | 3797578 | A1 * | 3/2021 | A01F 15/071 |
| EP | 3939413 | A1 * | 1/2022 | A01F 15/071 |
| GB | 2295453 | A * | 5/1996 | B65H 26/08 |
| WO | WO-2015035375 | A1 * | 3/2015 | A01F 15/0715 |

* cited by examiner

ROUND BALER WRAP USAGE INDICATOR

TECHNICAL FIELD

The disclosure generally relates to a baler implement and a method of operating the baler implement.

BACKGROUND

A baler implement that is configured to form a bale having a cylindrical shape may be referred to as a round baler. Such a baler implement includes a baling chamber that forms the cylindrically shaped bale. The baler implement may include a wrap system operable to feed a wrap material into the baling chamber. The wrap material is supplied/provided from a supply roll of the wrap material mounted in the wrap system of the baler implement. The wrap material may include, for example, a net or sheet material. When the bale is fully formed within the baling chamber, the wrap system is engaged to feed and/or introduce the wrap material from the supply roll of the wrap material into the baling chamber. Rotation of the bale within the baling chamber causes the wrap material to encircle the bale.

Because the length of the wrap material used to encircle or wrap each bale may differ, for example, due to variations in diametric size of each respective bale, it is difficult to estimate how many bales may be wrapped with a full supply roll of the wrap material. The supply roll of the wrap material is generally positioned underneath a hood and hidden from view during operation of the baler implement. As such, a remaining length of the wrap material on the supply roll is not easily viewed by the operator. The operator generally must stop the baling process and raise the hood to view the remaining length of the wrap material on the supply roll. In some implementations, the wrap material may include markings, such as for example, colored strips, which indicate the supply roll of the wrap material is nearly empty.

SUMMARY

A method of operating a baler implement is provided. The baler implement is operable to form a bale having a cylindrical shape, and wrap the bale with a wrap material. The method includes receiving a supply roll length input with a baler controller. The supply roll length input includes a total longitudinal length of the wrap material included on a full supply roll of the wrap material. The baler controller determines a respective length of the wrap material used to wrap each bale since receiving the supply roll length input. The baler controller sums all of the respective lengths of the wrap material used to wrap each bale since receiving the supply roll length input to define a total current used wrap value. The baler controller may then subtract the total current used wrap value from the total longitudinal length to define a current remaining length of the wrap material. The baler controller may then communicate a notification signal to a communicator. The notification signal indicates the current remaining length of the wrap material on the supply roll of the wrap material.

In one aspect of the disclosure, the baler implement includes one or more sensors positioned on the baler implement to sense data related to wrap usage. The method described herein may further include the step of sensing data related to the respective length of the wrap material used to wrap each bale with the sensor. The sensed data related to the respective length of the wrap material used to wrap each bale is communicated from the sensor to the baler controller, whereby the baler controller uses the sensed data to determine the respective length of the wrap material used to wrap each bale.

In one implementation of the method described herein, the step of sensing data related to the respective length of the wrap material used to wrap each bale includes sensing a dispensing speed of the wrap material during a bale wrap process, and sensing a time period during which the wrap material is dispensed during the bale wrap process. In one implementation of the process described herein, sensing the dispensing speed of the wrap material during the bale wrap process may include sensing a linear speed of the wrap material. In another implementation of the process, the step of sensing the dispensing speed of the wrap material may include sensing a rotational speed of a supply roller engaged with the wrap material during the bale wrap process. In one aspect of the process described herein, the step of determining the respective length of the wrap material used to wrap each bale includes multiplying the dispensing speed by the time period to calculate the respective length of the wrap material used to wrap each bale.

In one aspect of the process described herein, the method may further include automatically detecting installation of the supply roll of the wrap material into the wrap system of the baler implement. In one implementation of the process described herein, upon detecting installation of the supply roll of the wrap material into the wrap system of the baler implement, the baler controller may automatically prompt an operator to enter the supply roll length input into the baler controller. In another implementation of the process described herein, upon detecting installation of the supply roll of the wrap material into the wrap system of the baler implement, the baler implement may automatically scan a data device disposed on the supply roll of the wrap material with a reader. The reader may be disposed on the baler implement and positioned to detect and/or interrogate the data device providing the supply roll length input. In one implementation, the data device may include, but is not limited to, an RFID tag, and the reader may include, but is not limited to, an RFID reader.

In one aspect of the process described herein, the detected data providing the supply roll length input obtained from the data device by the reader may be automatically communicated from the reader to the baler controller.

In one aspect of the process described herein, the communicator may include, but is not limited to, a visual display device. The notification signal may be configured to display a visual indication of the current remaining length of the wrap material on the supply roll of the wrap material. For example, the notification signal may be configured to display a graph or indicia indicating the remaining amount of the wrap material left of the supply roll, a graph or indicia indicating a percentage of the full supply roll of the wrap material currently remaining on the supply roll of the wrap material, a graph or indicia of an estimated number of bales that may be wrapped with the remaining length of the wrap material, etc.

A baler implement is also provided. The baler implement includes a baling chamber operable to form a material into a bale having a cylindrical shape. The baler implement further includes a wrap system that is operable to supply a wrap material from a supply roll of the wrap material into the baling chamber to wrap the bale. A baler controller includes a processor and a memory having a wrap monitoring algorithm stored thereon. The processor is operable to execute the wrap monitoring algorithm to receive a supply roll length input defining a total longitudinal length of the wrap material included on a full supply roll of the wrap material. The baler controller determines a respective length of the wrap material used to wrap each bale since receiving the supply roll length input, and sum all of the respective lengths of the wrap material used to wrap each bale since receiving the supply roll length input, to define a total current used wrap value. The baler controller may then subtract the total current used wrap value from the total longitudinal length to define a current remaining length of the wrap material, and communicate a notification signal to a communicator. The notification signal indicates the current remaining length of the wrap material on the supply roll of the wrap material.

In one aspect of the baler implement described herein, the baler implement includes at least one sensor that is positioned and operable to sense data related to the respective length of the wrap material used to wrap each bale. The processor is operable to execute the wrap monitoring algorithm to sense data with the sensor. The data related to the respective length of the wrap material used to wrap each bale may include, but is not limited to, a dispensing speed of the wrap material during a bale wrap process, and a time period during which the wrap material is dispensed during the bale wrap process.

In one aspect of the baler implement described herein, the processor is operable to execute the wrap monitoring algorithm to determine the respective length of the wrap material used to wrap each bale by multiplying the dispensing speed by the time period to calculate the respective length of the wrap material used to wrap each bale.

In one aspect of the baler implement described herein, the processor is operable to execute the wrap monitoring algorithm to automatically detect installation of a supply roll of the wrap material into the wrap system. Upon detecting installation of the supply roll of the wrap material into the wrap system of the baler implement, the processor may be operable to execute the wrap monitoring algorithm to automatically prompt an operator to enter the supply roll length input.

In one aspect of the baler implement disclosed herein, the baler implement may include a reader positioned to detect a data device on the supply roll of the wrap material in the wrap system. In one example implementation, the reader may include, but is not limited to, a RFID reader, and the data device may include, but is not limited to, a RFID tag attached to the supply roll of the wrap material. Upon detecting installation of the supply roll of the wrap material into the wrap system, the processor may be operable to execute the wrap monitoring algorithm to automatically scan the data device disposed on the supply roll of the wrap material, with the reader, to detect data providing the supply roll length input.

In one aspect of the baler implement described herein, the communicator includes a display device. The processor is operable to communicate the notification signal to the display device to present a visual indication on the display device of the current remaining length of the wrap material on the supply roll of the wrap material.

Accordingly, the baler implement and the process described herein notify the operator of the remaining length of the wrap material on the supply roll. As such, the operator may monitor the status of the supply roll of the wrap material, and timely schedule replacement of the supply roll of the wrap material without having to stop the baling process and/or raise the hood covering the wrap system.

The above features and advantages and other features and advantages of the present teachings are readily apparent from the following detailed description of the best modes for carrying out the teachings when taken in connection with the accompanying drawings.

DETAILED DESCRIPTION

Figure 1:
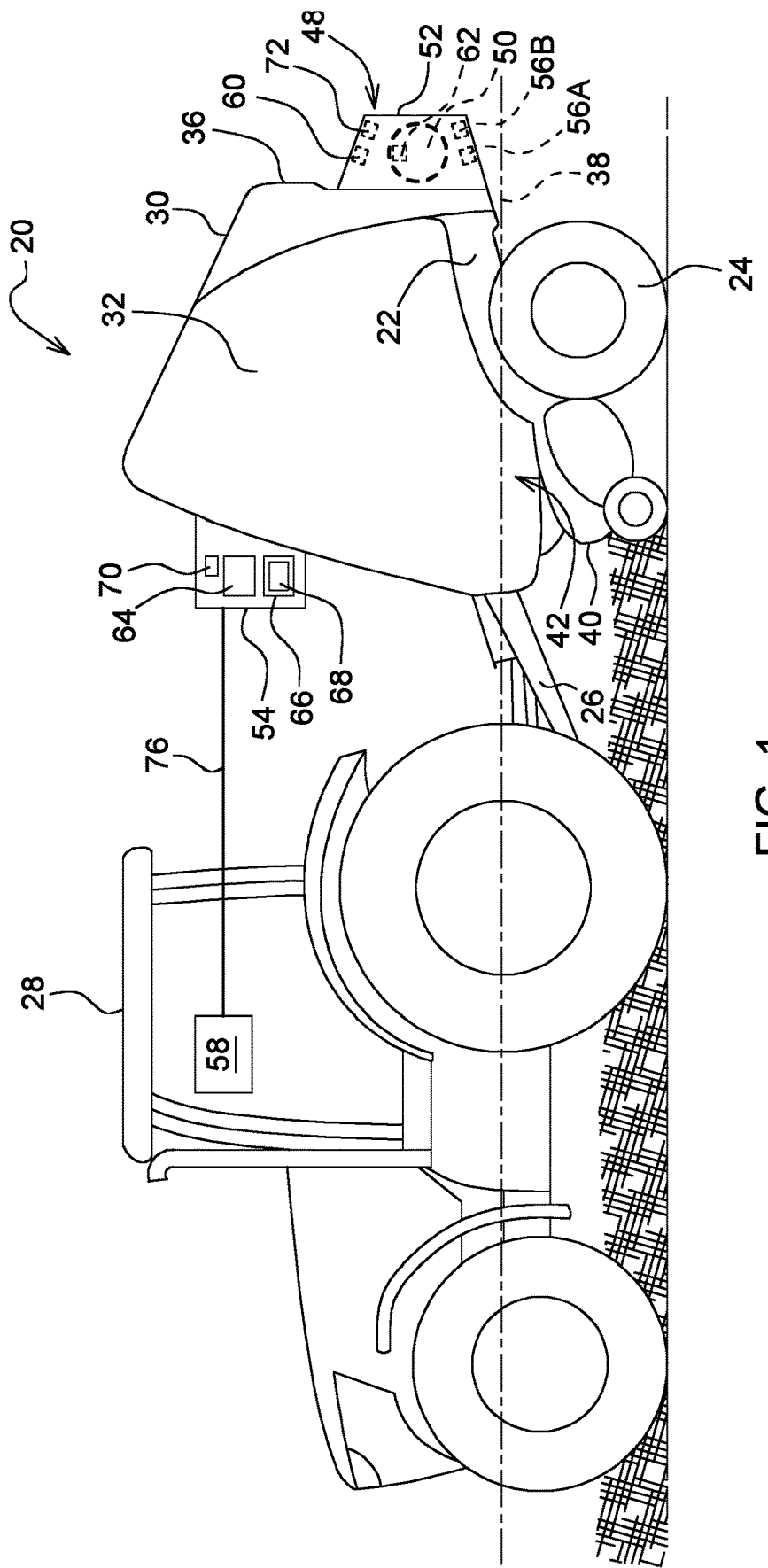
FIG. 1 is a schematic side view of a tractor towing a baler implement.
Figure 2:
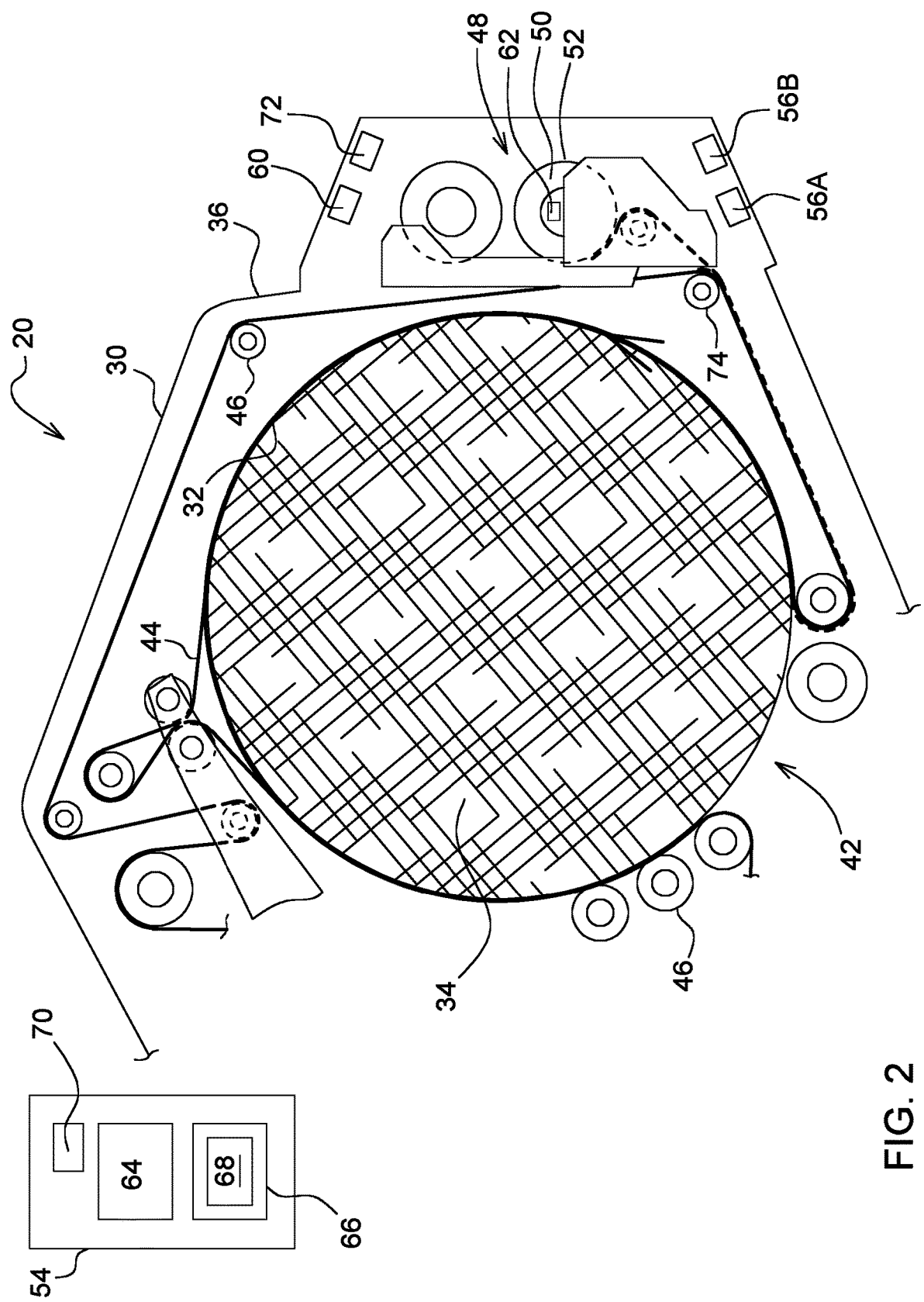
FIG. 2 is a schematic side view of the baler implement showing a wrap system thereof.
Figure 3:
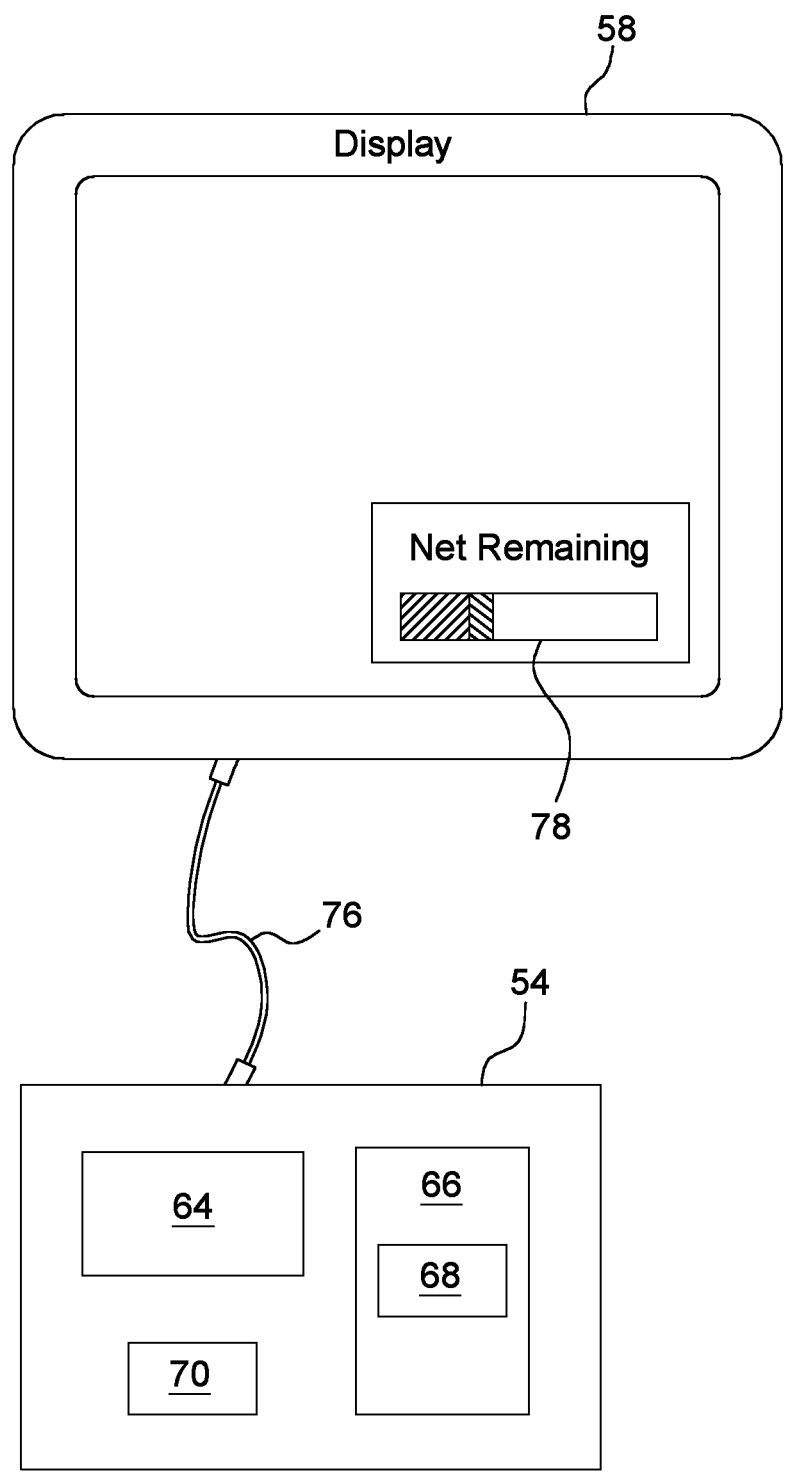
FIG. 3 is a schematic plan view of a display device showing a graph representing a remaining length of a wrap material on a supply roll.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a baler implement is generally shown at 20. The baler implement 20 may be referred to as a round baler. The baler implement 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement may be included with the tongue 26. The hitch arrangement may be used to attach the baler implement 20 to a traction unit 28, such as but not limited to an agricultural tractor 28. In other implementations, the baler implement 20 may be self-propelled, in which case the traction unit 28 and the baler implement 20 are configured as a single, self-propelled vehicle.

The baler implement 20 includes a housing 30 forming a baling chamber 32. The baling chamber 32 is configured to form a material, e.g., hay, straw, corn stalks, paper, cardboard, etc., into a bale 34 having a cylindrical shape. The housing 30 is attached to and supported by the frame 22. The housing 30 may include one or more walls or panels that at least partially enclose and/or define the baling chamber 32. The baler implement 20 may further include a gate 36. The gate 36 is attached to and rotatably supported by the housing 30. The gate 36 is positioned adjacent a rearward end of the frame 22 and is pivotably moveable about a gate axis. The gate axis is generally horizontal and perpendicular to a central longitudinal axis 38 of the frame 22. The gate 36 is moveable between a closed position for forming the bale 34 within the baling chamber 32, and an open position for discharging the bale 34 from the baling chamber 32.

The baler implement 20 includes a pick-up 40 disposed proximate the forward end of the frame 22. The pickup gathers crop material from a ground surface and directs the gathered crop material toward and into an inlet 42 of the baling chamber 32. The pickup may include, but is not limited to tines, forks, augers, conveyors, baffles, etc., for gathering and moving the crop material. The baler implement 20 may be equipped with a pre-cutter, disposed between the pickup and the inlet 42. As such, the pre-cutter is disposed downstream of the pickup and upstream of the inlet 42 relative to a direction of travel of the crop material. The pre-cutter cuts or chops the crop material into smaller pieces.

The baler implement 20 may be configured as a variable chamber baler, or as a fixed chamber baler. The example implementation of the baler implement 20 shown in the Figures and described herein is depicted and described as a variable chamber baler. As is understood by those skilled in the art, the variable chamber baler includes a plurality of longitudinally extending side-by-side forming belts 44 that are supported by a plurality of rollers 46. The bale 34 is formed by the forming belts 44 and one or more side walls of the housing 30.

The crop material is directed through the inlet 42 and into the baling chamber 32, whereby the forming belts 44 roll the crop material in a spiral fashion into the bale 34 having a cylindrical shape. The belts apply a constant pressure to the crop material as the crop material is formed into the bale 34. A belt tensioner continuously moves the forming belts 44 radially outward relative to a center of the cylindrical bale 34 as the diameter of the bale 34 increases. The belt tensioner maintains the appropriate tension in the belts to obtain the desired density of the crop material.

The baler implement 20 includes a wrap system 48. The wrap system 48 is operable to wrap the bale 34 with a wrap material 50 inside the baling chamber 32. The wrap system 48 supplies or feeds the wrap material 50 from a supply roll 52 of the wrap material 50 into the baling chamber 32 to wrap the bale 34. The path and manner in which the wrap system 48 moves the wrap material 50 may vary with different implementations of the baler implement 20, are understood by those skilled in the art, and therefore are not defined in greater detail herein.

Once the bale 34 is formed to a desired size, the wrap system 48 is engaged to feed the wrap material 50 into the baling chamber 32 to wrap the bale 34 and thereby secure the crop material in a tight package and maintain the desired shape of the bale 34. The wrap material 50 may include, but is not limited to, a net mesh or a solid plastic wrap. Movement of the gate 36 into the open position simultaneously moves the belts clear of the formed bale 34, and allows the formed and wrapped bale 34 to be discharged through the rear of the baling chamber 32.

During operation, the supply roll 52 of the wrap material 50 is loaded into the wrap system 48. The new or full supply roll 52 of the wrap material 50 has a total longitudinal length of the wrap material 50 contained thereon. Each respective bale 34 formed may be wrapped and/or bound with the wrap material 50 to secure the shape of the bale 34. Accordingly, each respective bale 34 that is wrapped diminishes and/or reduces a remaining length of the wrap material 50 contained on the supply roll 52. Once the supply roll 52 of the wrap material 50 is exhausted, i.e., empty, another new or full supply roll 52 of the wrap material 50 must be loaded into the wrap system 48 to continue the baling process. The length of the wrap material 50 used per each bale 34 may vary. For example, the baler implement 20 may be used to form cylindrical bale 34s having different diameters, such that the different diameters require a different amount or length of the wrap material 50. Manufacturing tolerances and control of the wrap system 48 may introduce variables into the wrapping process, such that cylindrical bale 34s having the same diameter may receive different amounts and/or lengths of the wrap material 50. Additionally, different types of crop may require additional wraps around the circumference of the bale 34 than other materials, thereby causing variations in the amount or length of the wrap material 50 used per each bale 34.

The baler implement 20 further includes a baler controller 54. The baler controller 54 is disposed in communication with one or more sensors 56A, 56B and a communicator 58. The baler controller 54 is operable to receive data from the sensors 56A, 56B and communicate a signal to the communicator 58. While the baler controller 54 is generally described herein as a singular device, it should be appreciated that the baler controller 54 may include multiple devices linked together to share and/or communicate information therebetween. Furthermore, it should be appreciated that the baler controller 54 may be located on the baler implement 20 or located remotely from the baler implement 20, e.g., on a tractor 28 attached to the baler implement 20.

The baler controller 54 may alternatively be referred to as a computing device, a computer, a controller, a control unit, a control module, a module, etc. The baler controller 54 includes a processor 64, a memory 66, and all software, hardware, algorithms, connections, sensors 56A, 56B, 72, etc., necessary to manage and control the operation of the baler implement 20 as described herein. As such, a method may be embodied as a program or algorithm operable on the baler controller 54. It should be appreciated that the baler controller 54 may include any device capable of analyzing data from various sensors 56A, 56B, 72, comparing data, making decisions, and executing the required tasks described herein.

As used herein, "baler controller 54" is intended to be used consistent with how the term is used by a person of skill in the art, and refers to a computing component with processing, memory 66, and communication capabilities, which is utilized to execute instructions (i.e., stored on the memory 66 or received via the communication capabilities) to control or communicate with one or more other components. In certain embodiments, the baler controller 54 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The baler controller 54 may be in communication with other components on the baler implement 20, such as hydraulic components, electrical components, and operator inputs within an operator station of an associated work vehicle. The baler controller 54 may be electrically connected to these other components by a wiring harness such that messages, commands, and electrical power may be transmitted between the baler controller 54 and the other components. Although the baler controller 54 is referenced in the singular, in alternative embodiments the configuration and functionality described herein can be split across multiple devices using techniques known to a person of ordinary skill in the art.

The baler controller 54 may be embodied as one or multiple digital computers or host machines each having one or more processors, read only memory (ROM), random access memory (RAM), electrically-programmable read only memory (EPROM), optical drives, magnetic drives, etc., a high-speed clock 70, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 66 may include any non-transitory/tangible medium which participates in providing data or computer-readable instructions. The memory 66 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The baler implement 20 may further include the communicator 58. The communicator 58 is disposed in communication with the baler controller 54. The communicator 58 may be located on the baler implement 20. However, in other implementations, the communicator 58 may be located remote from the baler implement 20, e.g., in an operator's cab of the tractor 28 connected to the baler implement 20. The communicator 58 may include, but is not limited to, a display device. The display device may include, for example, a touch screen display operable to display content as well as receive inputs. The display device may be located in the operator's cab of the tractor 28 and connected to the baler controller 54 via a wiring harness and/or through a wireless connection with the baler controller 54. In other implementations, the communicator 58 may include one or more lights and/or and an audio device, such as but not limited to a speaker.

As noted above, the baler implement 20 may further include at least one sensor 56A, 56B, 72 that is operable to sense data related to operation of the wrap system 48. The sensor may include a single device that detects or senses one or more types of data, or may include multiple devices, with each of the multiple devices detecting or sensing one or more types of data. As such, the sensor may include a single sensor, or multiple sensors. The sensor may include, but is not limited to, speed sensor 56A positioned to sense a speed of the wrap material 50 and/or a component of the wrap system 48 associated with moving the wrap material 50. For example, the speed sensor 56A may include a linear speed sensor 56A for detecting and/or sensing data related to the linear movement of the wrap material 50 in the longitudinal direction of the baler implement 20. As such, the linear speed sensor 56A may detect or sense a speed, e.g., unit distance per unit time, at which the wrap material 50 is inserted or fed into the baling chamber 32 during operation of the wrap system 48. In other implementations, the speed sensor 56A may include a rotational speed sensor 56A for detecting and/or sensing data related to the rotational speed of a roller of the wrap system 48 used to feed or insert the wrap material 50 into the baling chamber 32. For example, the rotational speed sensor 56A may sense a rotational speed of a feed or supply roller 74, and correlate the rotational speed to a linear speed of the wrap material 50.

In yet other implementations, the sensor may include a distance sensor that is operable to detect a distance or length of the wrap inserted into the baling chamber 32 during operation of the wrap system 48. For example, the wrap may be marked with indicia indicating length, and the sensor may be configured to measure a length of the wrap material 50 dispensed based on the indicia on the wrap material 50.

The sensor may further include a time sensor 56B. The time sensor 56B may be configured to detect or sense a period of time during which the wrap system 48 is engaged to dispense the wrap material 50 into the baling chamber 32 to wrap the bale 34. The time sensor 56B may be positioned to detect movement of a component of the wrap system 48 to determine when the wrap system 48 is engaged, and be associated with the clock 70 of the baler controller 54 to determine the duration of time that the wrap system 48 is engaged. For example, the wrap system 48 may include a lever that is disposed in a first position when the wrap system 48 is not engaged, and a second position when the wrap system 48 is engaged. The time sensor 56B may detect when the lever is disposed in the second position, and the clock 70 of the baler controller 54 may determine the length of time that the time sensor 56B indicates the lever is disposed in the second position, thereby providing the duration of time that the wrap system 48 is engaged. It should be appreciated that the time sensor 56B may be configured differently than described herein.

In one implementation, the baler implement 20 may further include a reader 60 positioned to detect a data device 62 on the supply roll 52 of the wrap material 50 when loaded in the wrap system 48. For example, the reader 60 may include, but is not limited to a Radio Frequency Identification Device (RFID) reader 60, and the data device 62 may include, but is not limited to, an RFID tag. The RFID tag may be configured to include or provide data related to a total longitudinal length of the wrap material 50 included on a full supply roll 52 of the wrap material 50. The reader 60 is disposed in communication with the baler controller 54. The reader 60 is operable to interrogate 36 the data device 62 to learn the total longitudinal length of the wrap material 50 included on a full supply roll 52 of the wrap material 50 and communicate the same to the baler controller 54.

The baler controller 54 includes the tangible, non-transitory memory 66 on which are recorded computer-executable instructions, including a wrap monitoring algorithm 68. The processor 64 of the baler controller 54 is configured for executing the wrap monitoring algorithm 68. The wrap monitoring algorithm 68 implements a method of operating the baler implement 20 to monitor the status of the supply roll 52 of the wrap material 50 in the wrap system 48, described in detail below.

The method of operating the baler implement 20 and monitoring the status of the supply roll 52 of the wrap material 50 is described in greater detail below. The method may include automatically detecting installation of the supply roll 52 of the wrap material 50 into the wrap system 48 of the baler implement 20. The step of detecting installation of the supply roll 52 is generally indicated by box 120 shown in FIG. 4. The installation of the supply roll 52 may be automatically detected by an installation sensor 72, and the related data communicated to the baler controller 54. The installation sensor 72 may include a device positioned to detect installation of the supply roll 52 of the wrap material 50 into the wrap system 48. The installation sensor 72 may include, but is not limited to, an optical sensor, a weight sensor, a position sensor, etc.

Upon detecting installation of the supply roll 52 of the wrap material 50 into the wrap system 48 of the baler implement 20, the process includes defining a supply roll length input. The step of defining the supply roll length input is generally indicated by box 122 shown in FIG. 4. In one implementation, upon detecting installation of the supply roll 52 of the wrap material 50 into the wrap system 48 of the baler implement 20, the baler controller 54 may automatically prompt an operator to enter the supply roll length input via the communicator 58. The supply roll length input includes or defines a total longitudinal length of the wrap material 50 included on a new or full supply roll 52 of the wrap material 50.

In another implementation, upon detecting installation of the supply roll 52 of the wrap material 50 into the wrap system 48 of the baler implement 20, the baler controller 54 may automatically scan the data device 62 disposed on the supply roll 52 of the wrap material 50, with the reader 60, to detect data providing the supply roll length input. The detected data providing the supply roll length input obtained from the data device 62 by the reader 60 may then be automatically communicated to the baler controller 54.

If the baler implement 20 is not equipped with the reader 60, the new supply roll 52 of the wrap material 50 is not equipped with the data device 62 and/or the baler controller 54 is not configured to automatically scan the data device 62, then the method may include the operator manually inputting the supply roll length input when the new or full supply roll 52 of the wrap material 50 is loaded into the wrap system 48. The operator may obtain the supply roll length input from the manufacturer of the supply roll 52. The operator may enter the supply roll length input via an input device. The input device may include and/or be incorporated with the communicator 58. For example, if the communicator 58 is configured as a touch screen display, the communicator 58 may be used to both communicate to the operator, as well as receive inputs and/or commands from the operator. In other implementations, the input device may include a keyboard, a mouse, a handheld device in communication with the baler controller 54, etc.

The baler controller 54 receives the supply roll length input. As noted above, the supply roll length input includes or defines the total longitudinal length of the wrap material 50 included on a full supply roll 52 of the wrap material 50. The baler controller 54 may then save the total longitudinal length of the wrap material 50 on the supply roll 52 in the memory 66 of the baler controller 54 for later reference/use.

Figure 4:
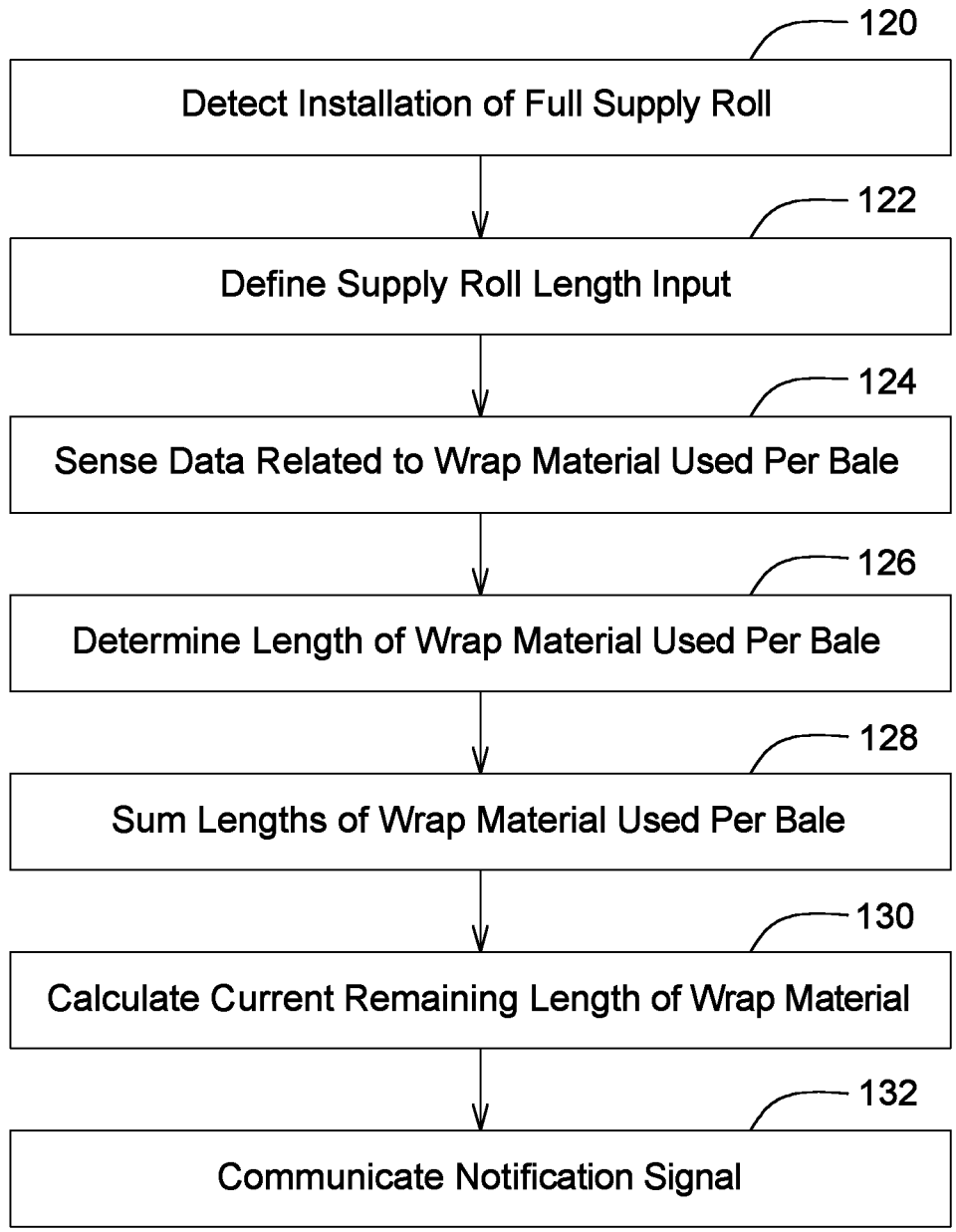
FIG. 4 is a flow chart representing a method of operating the baler implement to monitor the status of the supply roll of the wrap material.

Data related to the respective length of the wrap material 50 used to wrap each bale 34 may then be sensed with the sensors 56A, 56B. the step of sensing data related to the respective length of the wrap material 50 used to wrap each bale 34 is generally indicated by box 124 shown in FIG. 4. The sensors 56A, 56B communicate the data related to the respective length of the wrap material 50 used to wrap each bale 34 to the baler controller 54. As described above, the sensors 56A, 56B may include, but are not limited to the speed sensor 56A operable to sense a dispensing speed of the wrap material 50 during the wrapping process. The dispensing speed may include, but is not limited to, sensing the linear speed of the wrap material 50 and/or sensing a rotational speed of a supply roller 74 engaged with the wrap material 50 during the bale 34 wrap process. Additionally, sensing the data related to the respective length of the wrap material 50 used to wrap each bale 34 may include sensing a time period, with the time sensor 56B, during which the wrap material 50 is dispensed during the bale 34 wrap process.

Using the data related to the respective length of the wrap material 50 used to wrap each bale 34, the baler controller 54 may then determine a respective length of the wrap material 50 used to wrap each bale 34 since receiving the supply roll length input. The step of determining the respective length of the wrap material 50 used per bale is generally indicated by box 126 shown in FIG. 4. If the data related to the respective length of the wrap material 50 includes a sensed distance/length of the wrap material 50 dispensed for the bale 34, the baler controller 54 may simply use the sensed distance/length as the respective length of the wrap material 50. However, if the data related to the respective length of the wrap material 50 includes the dispensing speed of the wrap system 48 and time period during which the wrap system 48 was engaged, then the controller may determine the respective length of the wrap material 50 used to wrap each bale 34 by multiplying the dispensing speed by the time period to calculate the respective length of the wrap material 50 used to wrap each bale 34.

The baler controller 54 may then add or sum all of the respective lengths of the wrap material 50 used to wrap each bale 34 since receiving the supply roll length input. The step of summing the respective lengths used to wrap each bale is generally indicated by box 128 shown in FIG. 4. The sum of all of the respective lengths of the wrap material 50 used to wrap each bale 34 since receiving the supply roll length input defines a total current used wrap value. It should be appreciated that the total current used wrap value changes or increases with each respective bale 34 that is wrapped. As such, the sum is a running total of the wrap material 50 used, and that the step of summing the respective lengths of the wrap material 50 used to wrap each bale 34 is a repetitive process performed after the completion of each respective bale 34.

The baler controller 54 may then subtract the summed total current used wrap value from the total longitudinal length to define a current remaining length of the wrap material 50. The step of calculating the current remaining length of the wrap material 50 is generally indicated by box 130 shown in FIG. 4. The current remaining length of the wrap material 50 represents the estimated length of the wrap material 50 currently contained on the supply roll 52 of the wrap material 50.

The baler controller 54 may then communicate a notification signal 76 to the communicator 58. The step of communicating the notification signal 76 is generally indicated by box 132 shown in FIG. 4. The notification signal 76 is configured to indicate the current remaining length of the wrap material 50 on the supply roll 52 of the wrap material 50. In one implementation, the notification signal 76 may be configured to display a visual indication of the current remaining length of the wrap material 50 on the supply roll 52 of the wrap material 50. For example, the notification signal 76 may be configured to display a graph 78 or indicia indicating the remaining amount of the wrap material 50 left of the supply roll 52, a graph 78 or indicia indicating a percentage of the full supply roll 52 of the wrap material 50 currently remaining on the supply roll 52 of the wrap material 50, a graph 78 or indicia of an estimated number of bale 34s that may be wrapped with the remaining length of the wrap material 50, etc. In other implementations, the notification signal 76 may be configured to include an audio message describing of the current remaining length of the wrap material 50 on the supply roll 52 of the wrap material 50, or activate a warning light indicating that the supply roll 52 of the wrap material 50 is below a defined threshold.

The system and process described above enable the operator of the baler implement 20 to know the status of the supply roll 52 of the wrap material 50 without having to stop the baling process and manually open and inspect the wrap system 48 to determine the status of the supply roll 52. By knowing the status of the amount of wrap material 50 remaining on the supply roll 52, the operator of the baler implement 20 may plan the replacement of the supply roll 52 of the wrap material 50 and ensure that the new supply roll 52 is available and ready.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of operating a baler implement operable to form a bale having a cylindrical shape and wrap the bale with a wrap material, the method comprising:
   receiving a supply roll length input with a baler controller, wherein the supply roll length input includes a total longitudinal length of the wrap material included on a full supply roll of the wrap material;
   sensing data related to the respective length of the wrap material used to wrap each bale, with a sensor positioned on the baler implement, wherein sensing data related to the respective length of the wrap material used to wrap each bale includes sensing a dispensing speed of the wrap material during a bale wrap process and sensing a time period during which the wrap material is dispensed during the bale wrap process;
   determining, with the baler controller, a respective length of the wrap material used to wrap each bale since receiving the supply roll length input, wherein determining the respective length of the wrap material used to wrap each bale includes multiplying the dispensing speed by the time period to calculate the respective length of the wrap material used to wrap each bale;
   summing, with the baler controller, all of the respective lengths of the wrap material used to wrap each bale since receiving the supply roll length input, to define a total current used wrap value;
   subtracting, with the baler controller, the total current used wrap value from the total longitudinal length to define a current remaining length of the wrap material; d
   communicating a notification signal to a communicator with the baler controller, wherein the notification signal indicates the current remaining length of the wrap material on the supply roll of the wrap material.

2. The method set forth in claim 1, further comprising communicating the sensed data related to the respective length of the wrap material used to wrap each bale from the sensor to the baler controller, whereby the baler controller uses the sensed data to determine the respective length of the wrap material used to wrap each bale.

3. The method set forth in claim 1, wherein sensing the dispensing speed of the wrap material during the bale wrap process includes sensing a linear speed of the wrap material.

4. The method set forth in claim 1, wherein sensing the dispensing speed of the wrap material during the bale wrap process includes sensing a rotational speed of a supply roller engaged with the wrap material during the bale wrap process.

5. The method set forth in claim 1, further comprising automatically detecting installation of a supply roll of the wrap material into a wrap system of the baler implement.

6. The method set forth in claim 5, further comprising automatically prompting an operator to enter the supply roll length input into the baler controller upon detecting installation of the supply roll of the wrap material into the wrap system of the baler implement.

7. The method set forth in claim 5, further comprising automatically scanning a data device disposed on the supply roll of the wrap material, with a reader disposed on the baler implement, to detect data providing the supply roll length input upon detecting installation of the supply roll of the wrap material into the wrap system of the baler implement.

8. The method set forth in claim 7, further comprising automatically communicating the detected data providing the supply roll length input from the reader to the baler controller.

9. The method set forth in claim 1, wherein communicating the notification signal to the communicator includes displaying a visual indication of the current remaining length of the wrap material on the supply roll of the wrap material.

10. A baler implement comprising:
   a baling chamber operable to form a material into a bale having a cylindrical shape;
   a wrap system operable to supply a wrap material from a supply roll of the wrap material into the baling chamber to wrap the bale;
   a baler controller including a processor and a memory having a wrap monitoring algorithm stored thereon, wherein the processor is operable to execute the wrap monitoring algorithm to:
      receive a supply roll length input defining a total longitudinal length of the wrap material included on a full supply roll of the wrap material;
      sense data related to the respective length of the wrap material used to wrap each bale, with a sensor positioned on the baler implement, wherein the data related to the respective length of the wrap material used to wrap each bale includes a dispensing speed of the wrap material during a bale wrap process, and a time period during which the wrap material is dispensed during the bale wrap process;
      determine a respective length of the wrap material used to wrap each bale by multiplying the dispensing speed by the time period to calculate the respective length of the wrap material used to wrap each bale;
      sum all of the respective lengths of the wrap material used to wrap each bale since receiving the supply roll length input since receiving the supply roll length input, to define a total current used wrap value;

subtract the total current used wrap value from the total longitudinal length to define a current remaining length of the wrap material; and communicate a notification signal to a communicator, wherein the notification signal indicates the current remaining length of the wrap material on the supply roll of the wrap material.

11. The baler implement set forth in claim 10, wherein the processor is operable to execute the wrap monitoring algorithm to automatically detect installation of a supply roll of the wrap material into the wrap system.

12. The baler implement set forth in claim 11, wherein the processor is operable to execute the wrap monitoring algorithm to automatically prompt an operator to enter the supply roll length input upon detecting installation of the supply roll of the wrap material into the wrap system of the baler implement.

13. The baler implement set forth in claim 11, further comprising a reader positioned to detect a data device on the supply roll of the wrap material in the wrap system, and wherein the processor is operable to execute the wrap monitoring algorithm to automatically scan the data device disposed on the supply roll of the wrap material, with the reader, to detect data providing the supply roll length input upon detecting installation of the supply roll of the wrap material into the wrap system.

14. The baler implement set forth in claim 11, wherein the communicator includes a display device, and wherein the processor is operable to communicate the notification signal to the display device to present a visual indication of the current remaining length of the wrap material on the supply roll of the wrap material on the display device.

* * * * *